United States Patent
Kawamura et al.

(10) Patent No.: US 9,641,061 B2
(45) Date of Patent: May 2, 2017

(54) POWER SOURCE APPARATUS AND ELECTRIC DEVICE

(71) Applicant: EIZO Corporation, Ishikawa (JP)

(72) Inventors: Kunio Kawamura, Ishikawa (JP); Daisuke Sakai, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

(21) Appl. No.: 15/036,913

(22) PCT Filed: Apr. 10, 2014

(86) PCT No.: PCT/JP2014/060403
§ 371 (c)(1),
(2) Date: May 16, 2016

(87) PCT Pub. No.: WO2015/079722
PCT Pub. Date: Jun. 4, 2015

(65) Prior Publication Data
US 2016/0294273 A1    Oct. 6, 2016

(30) Foreign Application Priority Data

Nov. 26, 2013    (JP) ................................. 2013-244051

(51) Int. Cl.
*H02M 3/335*    (2006.01)
*H02M 1/00*    (2006.01)

(52) U.S. Cl.
CPC ......... *H02M 1/00* (2013.01); *H02M 3/33507* (2013.01); *H02M 3/33523* (2013.01);
(Continued)

(58) Field of Classification Search
CPC ......... H02M 3/33507; H02M 3/33523; H02M 3/33569; H02M 2001/007;
(Continued)

(56) References Cited

U.S. PATENT DOCUMENTS 9,455,639 B2 * 9/2016 Hayakawa ........... H03K 17/164
2004/0042239 A1   3/2004 Kitano
(Continued)

FOREIGN PATENT DOCUMENTS

JP    H04-10588 A    1/1992
JP    H11-275857 A    10/1999
(Continued)

OTHER PUBLICATIONS

Extended European Search Report dated Nov. 28, 2016, including the Supplementary European Search Report and the European Search Opinion, in connection with corresponding EP Application No. 14866265.3 (10 pgs.).
(Continued)

*Primary Examiner* — Yemane Mehari
(74) *Attorney, Agent, or Firm* — Maier & Maier, PLLC

(57) ABSTRACT

Provided are a power supply device capable of supplying required power even during standby and an electrical apparatus. A power supply device includes a current resonant circuit configured to drive a transformer and a resonant circuit using a switching element, the resonant circuit being connected to a primary side of the transformer, the switching element being periodically repeatedly turned on and off, and a controller configured to control the switching element so that the switching element performs a continuous operation in which the switching element is turned on and off continuously repeatedly or an intermittent operation in which the switching element is turned on and off intermittently repeatedly, in accordance with an external signal indicating the continuous operation or the intermittent operation.

8 Claims, 8 Drawing Sheets

(52) U.S. Cl.
CPC .. *H02M 3/33569* (2013.01); *H02M 2001/007* (2013.01); *H02M 2001/0032* (2013.01); *H02M 2001/0035* (2013.01); *H02M 2001/0058* (2013.01); *Y02B 70/1433* (2013.01); *Y02B 70/1491* (2013.01); *Y02B 70/16* (2013.01)

(58) Field of Classification Search
CPC . H02M 2001/0032; H02M 2001/0035; H02M 2001/0058; Y02B 70/1433; Y02B 70/1491
USPC .......................................... 363/21.01–21.18
See application file for complete search history.

(56) References Cited

U.S. PATENT DOCUMENTS

| | | | | |
|---|---|---|---|---|
| 2006/0285366 | A1* | 12/2006 | Radecker | H02M 3/33507 363/16 |
| 2012/0250356 | A1 | 10/2012 | Hu et al. | |
| 2012/0281440 | A1 | 11/2012 | Hayashi et al. | |
| 2016/0380527 | A1* | 12/2016 | Hayakawa | H02M 3/33507 363/21.12 |
| 2017/0012538 | A1* | 1/2017 | Barrenscheen | H02M 3/33507 |

FOREIGN PATENT DOCUMENTS

| | | | |
|---|---|---|---|
| JP | 2002-252973 | A | 9/2002 |
| JP | 2004-88959 | A | 3/2004 |
| JP | 2007-236129 | A | 9/2007 |
| JP | 2009-189108 | A | 8/2009 |
| JP | 2010/130774 | A | 6/2010 |

OTHER PUBLICATIONS

Hang-Seok Choi, et al., "Techniques to minimize Power Consumption of SMPS in Standby Mode", Power Electronics Specialists Conference, IEEE 36th, Piscataway, NJ, USA, Jan. 1, 2005, pp. 2817-2822 (6 pgs.).
International Search Report of corresponding International Application No. PCT/JP2014/060403 dated Jun. 24, 2014 ; 2 pgs.

* cited by examiner

POWER SOURCE APPARATUS AND ELECTRIC DEVICE

TECHNICAL FIELD

The present invention relates to a power supply device that includes a current resonant circuit driven by a switching element and causes the switching element to perform a continuous operation or an intermittent operation, and an electrical apparatus including the power supply device.

BACKGROUND ART

Among conventional power supply devices incorporated into an electrical apparatus, electronic apparatus, or the like and configured to supply relatively large power to a load are those which use a two-converter circuit in order to reduce standby power. For example, a two-converter circuit includes a main power supply circuit that supplies power to a load which consumes much power and a sub-power supply circuit that supplies power to a less power-consuming load, such as a control circuit, and operates the main and sub-power supply circuits in normal times and operates only the sub-power supply circuit during standby to reduce standby power. However, a two-converter circuit must include two power supply circuits and thus disadvantageously increases the size of the power supply apparatus and increases the cost.

For this reason, there is disclosed a switching power supply device that includes a single main power supply circuit as a power supply circuit and controls a transistor of a switching unit in the power supply circuit so that the transistor operates continuously when the load current is large; and the transistor operates intermittently when the load current is small (see Patent Literature 1).

Examples of a switching power supply device include those of flyback type and those of current resonant type. A current resonant power supply device is used, for example, when it is desired to increase efficiency when a heavy load is used, when it is desired to handle a large output current, or when it is desired to improve noise resistance.

CITATION LIST

Patent Literature

Patent Literature 1: Japanese Examined Utility Model Registration Application Publication No. 4-10588

SUMMARY OF INVENTION

Technical Problem

However, when a current resonant power supply device is operating a transistor intermittently during standby, it can supply only a small current to a load. For this reason, if a load which consumes much power is connected when the transistor is operating intermittently, the output voltage would be reduced, and the power supply device would temporarily stop to operate. Further, there is a demand to cause an electrical apparatus, such as a monitor (display), including such a power supply device to supply relatively large power even during standby.

The present invention has been made in view of the foregoing, and an object thereof is to provide a power supply device capable of supplying required power even during standby and an electrical apparatus including the power supply device.

Solution to Problem

The present invention provides a power supply device that includes a current resonant circuit configured to drive a transformer and a resonant circuit using a switching element, the resonant circuit being connected to a primary side of the transformer, the switching element being periodically repeatedly turned on and off, and a controller configured to control the switching element so that the switching element performs a continuous operation in which the switching element is turned on and off continuously repeatedly or an intermittent operation in which the switching element is turned on and off intermittently repeatedly, in accordance with an external signal indicating the continuous operation or the intermittent operation. The power supply device includes a voltage detector configured to detect a voltage on a secondary side of the transformer and a switching unit configured to, when the controller is controlling the switching element so that it performs the intermittent operation, in accordance with an external signal indicating the intermittent operation and when a voltage detected by the voltage detector has fallen below a predetermined first threshold voltage, cause the controller to control the switching element so that it switches to perform the continuous operation.

According to the present invention, the voltage detector detects the voltage on the secondary side of the transformer, that is, the output voltage. It is assumed that when the controller is controlling the switching element so that it operates intermittently, in accordance with an external signal indicating the intermittent operation, that is, when the controller is supplying power to a less power-consuming load during standby, the voltage detected by the voltage detector has fallen below the predetermined first threshold voltage. The reason why the voltage detected by the voltage detector is reduced is that a more power-consuming load is connected to the output of the power supply device and thus the load current is increased. In this case, the switching unit causes the controller to control the switching element so that the intermittent operation of the switching element switches to the continuous operation.

During standby, the switching element which has been switched to be in the continuous operation operates continuously until the output voltage is again raised to some extent. Thus, even when a relatively large load is connected and thus the load current is increased, the output voltage is prevented from keeping falling below the first threshold voltage, and the required power can be supplied even during standby.

In the power supply device of the present invention, when the switching unit has caused the controller to control the switching element so that it switches to perform the continuous operation and when the voltage detected by the voltage detector has risen above a second threshold voltage which is higher than the first threshold voltage, the switching unit causes the controller to control the switching element so that it switches to perform the intermittent operation.

According to the present invention, when the switching unit has caused the controller to control the switching element so that it switches to perform the continuous operation during standby and when the voltage detected by the voltage detector has risen above the second threshold voltage, which is higher than the first threshold voltage, the switch unit causes the controller to control the switching element so that it switches to perform the intermittent operation. When a relatively large load is connected during standby and the operation of the switching element is switched from the intermittent operation to the continuous operation, a large load current can be supplied. When the sufficient current is supplied to the connected load, the output voltage is increased. When the voltage detected by the voltage detector (output voltage) has risen above the second threshold voltage, which is higher than the first threshold voltage, the operation of the switching element is returned to the intermittent operation, which is a standby operation, since the sufficient power is being supplied to the load. Further, the first threshold voltage and second threshold voltage are different voltages and therefore it is possible to prevent the operation from being frequently switched between the intermittent operation and the continuous operation.

In the power supply device of the present invention, when the controller is being given an external signal indicating the continuous operation, the switching unit invalidates detection of the voltage by the voltage detector.

According to the present invention, when the controller is being given an external signal indicating the continuous operation, the switching unit invalidates detection of the voltage by the voltage detector. Thus, it is possible to reliably prevent the normal operation (continuous operation) of the switching element from switching to the intermittent operation.

In the power supply device of the present invention, the voltage detector includes multiple resistors connected to the secondary side of the transformer in series; the switching unit includes a photodiode configured to be turned on or off in accordance with a voltage divided by the resistors and a phototransistor disposed on a primary side of the transformer and configured to be turned on or off in response to the photodiode being turned on or off; and the controller includes a transistor configured to determine the continuous operation or the intermittent operation in accordance with an on state or an off state of itself and is configured to turn on or off the transistor in response to the phototransistor being turned on or off.

According to the present invention, the voltage detector includes the resistors connected the secondary side of the transformer in series. For example, by series-connecting the resistors to the secondary side of the transformer, that is, between the output terminals of the power supply device and detecting the voltage of the junction of the resistors, the output voltage can be divided into a required voltage using the resistors. The switching unit includes the photodiode configured to be turned on or off in accordance with the level of the divided voltage and the phototransistor disposed on the primary side of the transformer and configured to be turned on or off in response to the photodiode being turned on or off. The controller includes the transistor and controls the switching element so that the switching element performs the continuous operation or the intermittent operation, in accordance with whether the transistor is in an on state or in an off state. The controller turns on or off the transistor in response to the phototransistor being turned on or off. Thus, for example, when the voltage detected by the voltage is reduced (for example, when the voltage has fallen below the first threshold voltage), the phototransistor is turned on, and the transistor is turned on to switch the operation mode of the switching element from the intermittent operation to the continuous operation. As a result, even during standby, power can be supplied when an external load is connected.

In the power supply device of the present invention, the switching unit further includes a diode connected to a cathode of the photodiode and is configured to, when the switching unit is being given an external signal indicating the continuous operation, turn on the diode.

According to the present invention, the switching unit includes the diode connected to the cathode of the photodiode. When the switching unit is being given an external signal indicating the continuous operation, it turns on the diode. When the switching unit is being given an external signal indicating the continuous operation, that is, when the operation mode is the continuous operation, the output voltage rises above the first threshold voltage and second threshold voltage, and the switching unit attempts to switch the operation of the switching element to the intermittent operation. For this reason, by turning on the diode and forcefully turning on the photodiode, the transistor is turned on so that the operation mode becomes the continuous operation. Thus, when an external signal indicating a continuous operation is being given, the switching element can be operated continuously, regardless of the presence of the voltage detector.

The present invention provides a power supply device that includes a current resonant circuit configured to drive a transformer and a resonant circuit using a switching element, the resonant circuit being connected to a primary side of the transformer, the switching element being periodically repeatedly turned on and off, and a controller configured to control the switching element so that the switching element performs a continuous operation in which the switching element is turned on and off continuously repeatedly or an intermittent operation in which the switching element is turned on and off intermittently repeatedly, in accordance with an external signal indicating the continuous operation or the intermittent operation. The power supply device includes a load detector configured to detect magnitude of a load on a secondary side of the transformer and a switching unit configured to, when the controller is controlling the switching element so that it performs the intermittent operation, in accordance with an external signal indicating the intermittent operation and when a load detected by the load detector has become larger than a predetermined first threshold, cause the controller to control the switching element so that it switches to perform the continuous operation.

According to the present invention, the load detector detects the magnitude of the load on the secondary side of the transformer. The magnitude of the load is, for example, the magnitude of the current flowing through the load, but not limited thereto. It is assumed that when the controller is controlling the switching element so that it operates intermittently, in accordance with an external signal indicating the intermittent operation, that is, when the controller is supplying power to a less power-consuming load during standby, the load detected by the load detector has risen above the predetermined first threshold. The reason why the load detected by the load detector is increased is that a more power-consuming load is connected to the output of the power supply device and thus the load current is increased. In this case, the switching unit causes the controller to control the switching element so that the intermittent operation of the switching element switches to the continuous operation.

During standby, the switching element which has been switched to be in the continuous operation operates continuously until the output voltage is again raised to some extent. Thus, even when a relatively large load is connected and thus the load current is increased, the output voltage is prevented from keeping falling below the first threshold voltage, and the required power can be supplied even during standby.

The present invention provides a power supply device that includes a current resonant circuit configured to drive a transformer and a resonant circuit using a switching element, the resonant circuit being connected to a primary side of the transformer, the switching element being periodically repeatedly turned on and off, and a controller configured to control the switching element so that the switching element performs a continuous operation in which the switching element is turned on and off continuously repeatedly or an intermittent operation in which the switching element is turned on and off intermittently repeatedly, in accordance with an external signal indicating the continuous operation or the intermittent operation. The power supply device includes a connection determination unit configured to determine whether an external device has been connected to a secondary side of the transformer and a switching unit configured to, when the controller is controlling the switching element so that it performs the intermittent operation, in accordance with an external signal indicating the intermittent operation and when the connection determination unit determines that an external device has been connected, cause the controller to control the switching element so that it switches to perform the continuous operation.

According to the present invention, the connection determination unit determines whether an external device has been connected to the secondary side of the transformer. It is assumed that when the controller is controlling the switching element so that it operates intermittently, in accordance with an external signal indicating the intermittent operation, that is, when the controller is supplying power to a less power-consuming load during standby and when the connection determination unit determines that an external device has been connected, the switching unit causes the controller to control the switching element so that the intermittent operation of the switching element switches to the continuous operation.

During standby, the intermittent operation of the switching element is switched to the continuous operation. Thus, even when an external device is connected and thus the load is increased, sufficient power can be supplied to the external device. As a result, the required power can be supplied even during standby.

The present invention provides an electrical apparatus including any one of the above power supply devices and a connector disposed on a secondary side of the transformer. When the power supply device is given an external signal indicating the intermittent operation, the power supply device can supply power to an external device connected to the connector.

According to the present invention, when the power supply device is given an external signal indicating the intermittent operation and when a more power-consuming external device is connected to the connector, it is possible to temporarily switch the operation mode from the intermittent operation to the continuous operation and to supply the required power to the external device.

Advantageous Effects of Invention

According to the present invention, required power can be supplied even during standby.

DESCRIPTION OF EMBODIMENTS

First Embodiment

Figure 1:
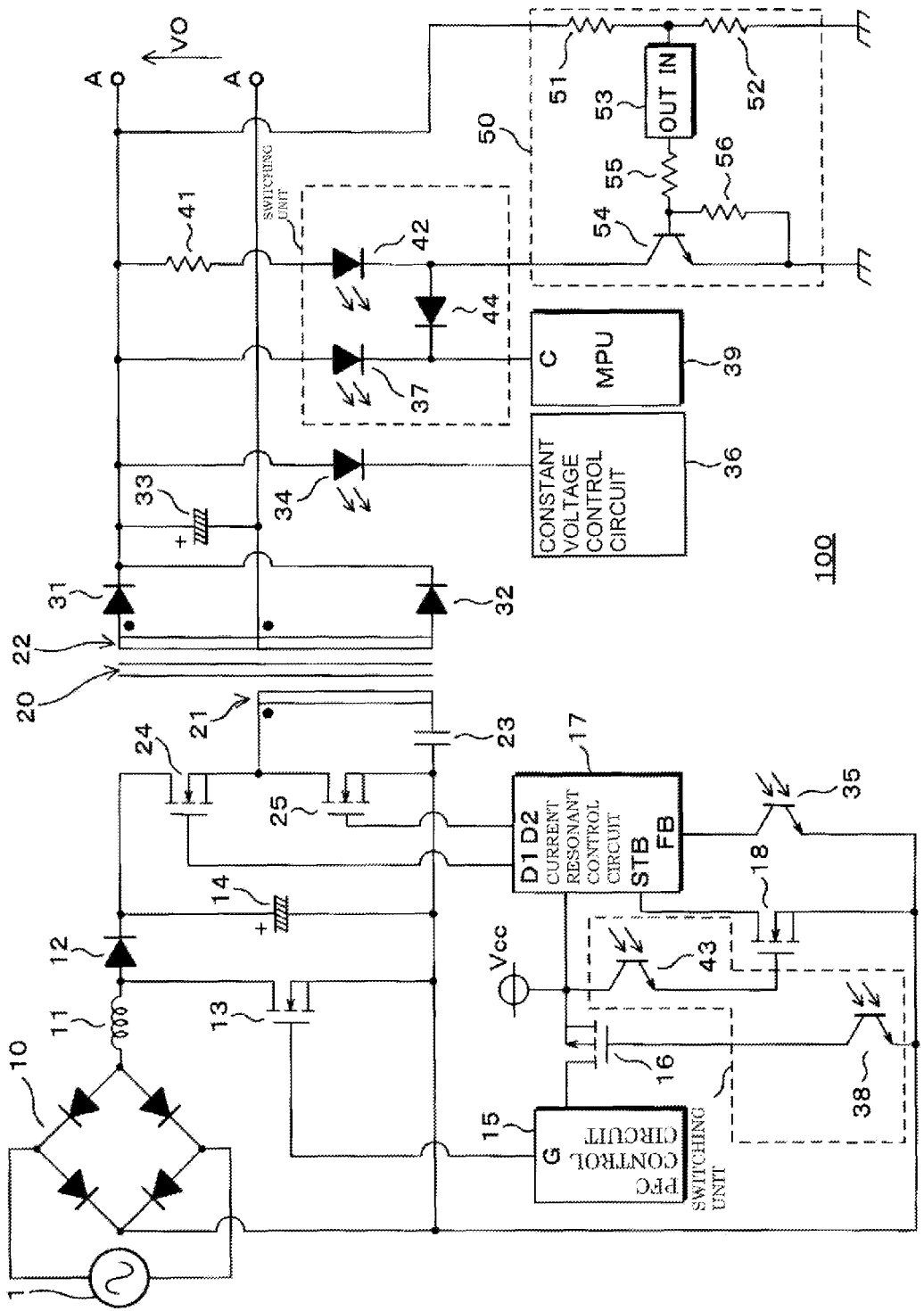
FIG. 1 is a block diagram showing an example of the circuit configuration of a power supply device of a first embodiment.

Now, embodiments of a power supply device of the present invention will be described with reference to the drawings. FIG. 1 is a block diagram showing an example of the circuit configuration of a power supply device of a first embodiment. The input terminal of the power supply device 100 is connected to a commercial power supply 1 (e.g., AC 100V, AC 200V). The power supply device 100 receives an alternating-current (AC) voltage from the commercial power supply 1 and full-wave rectifies the received AC voltage into a direct-current (DC) voltage using a diode bridge 10.

A coil (inductor) 11 and a diode 12 are connected to the output of the diode bridge 10 in series. Connected between the junction of the coil 11 and diode 12 and the ground level is an FET 13. Connected to the gate of the FET 13 is an output terminal G of a PFC control circuit 15. The coil 11, diode 12, and FET 13 constitute a PFC circuit. The PFC control circuit 15 can perform power factor correction (PFC) by controlling the switching operation of the FET 13. Note that the PFC circuit is not limited to the configuration shown in FIG. 1. There may be used other circuit configurations, such as a choke input rectifier circuit, which expands the conduction angle using a choke coil, as long as they can make the current waveform similar to a sinusoidal waveform.

Connected to the output of the diode 12 are a smoothing capacitor 14 and FETs 24 and 25 that are connected in series and serve as switching elements. Connected to the junction of the FETs 24 and 25 is one end of a primary winding 21 of a transformer 20. The other end of the primary winding 21 is connected to the ground level through a capacitor 23.

A secondary winding 22 of the transformer 20 consists of three terminals. Connected to two of the three terminals are the anodes of diodes 31 and 32. The cathodes of the diodes 31 and 32 are connected to each other and connected to the positive terminal of output terminals A. The remaining terminal of the secondary winding 22 is connected to the negative terminal of the output terminals A. Connected to the outputs of the diodes 31 and 32 is a smoothing capacitor 33.

The PFC control circuit 15 receives power from a predetermined voltage source Vcc (e.g., a DC voltage obtained by rectifying an AC voltage generated by the transformer 20) through an FET 16. A phototransistor 38 is connected between the gate of the FET 16 and the ground level. A photodiode 37 forms a photocoupler with the phototransistor 38 and is connected between the positive terminal of the output terminals A and an output terminal C of an MPU 39.

That is, when the required current flows through the photodiode 37 and thus the phototransistor 38 is turned on, the FET 16 is turned on and thus the PFC circuit operates. On the other hand, when the required current does not flow through the photodiode 37 and thus the phototransistor 38 is turned off, the FET 16 is turned off and thus the PFC circuit stops operating.

A current resonant control circuit 17 can be formed by an IC element, and two output terminals, D1 and D2, thereof are connected to the gates of the FET 24 and FET 25, respectively. An inductance included in the transformer 20 and the capacitor 23 constitute a resonant circuit. That is, by alternately turning on or off the FETs 24 and 25, the current flowing through the resonant circuit can be caused to vibrate (resonate).

The current resonant control circuit 17 serves as a controller. The current resonant control circuit 17 controls the FET 24 and FET 25 so that the FETs perform a continuous operation in which the FETs are turned on and off continuously repeatedly or an intermittent operation in which the FETs are turned on and off intermittently repeatedly, in accordance with whether the voltage of the STB terminal is at a high level or low level. For example, when the voltage of the STB terminal is at a low level, the operation mode is continuous mode (normal mode) and therefore the FETs 24 and 25 perform the continuous operation. On the other hand, when the voltage of the STB terminal is at a high level, the operation mode is intermittent mode (standby mode) and therefore the FETs 24 and 25 perform the intermittent operation. The intermittent operation is also called a burst operation.

The current resonant control circuit 17 receives power from the predetermined voltage source Vcc. An FET 18 is connected between the STB terminal of the current resonant control circuit 17 and the ground level. A phototransistor 43 is connected between the gate of the FET 18 and the voltage source Vcc. A photodiode 42 forms a photocoupler with the phototransistor 43. The anode of the photodiode 42 is connected to the positive terminal of the output terminals A through a resistor 41, and the cathode thereof is connected to the ground level through a transistor 54.

That is, when the required current flows through the phototransistor 42 and thus the phototransistor 43 is turned on, the FET 18 is turned on. The voltage of the STB terminal is reduced to a low level and thus the FETs 24 and 25 operate in continuous mode (normal mode). On the other hand, when the required current does not flow through the phototransistor 42 and thus the phototransistor 43 is turned off, the FET 18 is turned off. The voltage of the STB terminal is raised to a high level and thus the FETs 24 and 25 operate in intermittent mode (standby mode). The photodiode 42, phototransistor 43, a diode 44 (to be discussed later), the photodiode 37, and the phototransistor 38 constitute a switching unit. The FET 18 constitutes part of the controller.

The current resonant control circuit 17 also controls the FETs 24 and 25 so that an output voltage VO becomes a constant voltage during a normal operation. That is, a phototransistor 35 is connected between the FB terminal of the current resonant control circuit 17 and the ground level. A photodiode 34 forms a photocoupler with the phototransistor 35. The current flowing through the photodiode 34 is inputted to the FB terminal through the phototransistor 35. Thus, the current resonant control circuit 17 controls the FETs 24 and 25 so that the output voltage VO becomes a constant voltage during the normal operation.

A voltage detector 50 serves as a load detector and includes resistors 51 and 52, a control IC 53, the transistor 54, the photodiode 42, and the like. The voltage detector 50 can detect the voltage on the secondary side of the transformer 20, that is, the output voltage between the output terminals A. Details of the voltage detector 50 will be described below. Note that the voltage detector 50 is not limited to the configuration shown in FIG. 1.

A series circuit consisting of the resistors 51 and 52 is connected between the positive terminal and negative terminal (ground level) of the output terminals A. Connected to the junction of the resistors 51 and 52 is an input terminal IN of the control IC 53. The control IC 53 detects the voltage of the junction of the resistors 51 and 52 and thus can detect a divided voltage obtained by dividing the output voltage into the required voltage using the resistors 51 and 52. An output terminal OUT of the control IC 53 is connected to the base of the transistor 54 through a resistor 55. Connected between the base and emitter of the transistor 54 is a bias resistor 56. When the voltage of the input terminal IN falls below a predetermined voltage (first threshold voltage Vth1), the control IC 53 raises the voltage of the output terminal OUT to a high level to turn on the transistor 54. On the other hand, when the voltage of the input terminal IN rises above a predetermined voltage (second threshold voltage Vth2>first threshold voltage Vth1), the control IC 53 reduces the voltage of the output terminal OUT to a low level to turn off the transistor 54.

The MPU 39 is, for example, a microprocessor and has a function of outputting external signals indicating a normal operation (continuous operation) and a standby operation (intermittent operation). When the MPU 39 acquires or generates an external signal indicating a normal operation, it reduces, to a low level, the voltage of the output terminal C to which the cathode of the photodiode 37 is connected and passes the required current through the photodiode 37 so as to turn on the phototransistor 38. On the other hand, when the MPU 39 acquires or generates an external signal indicating a standby operation, it raises the voltage of the output terminal C to a high level and reduces or shuts off the current flowing through the photodiode 37 so as to turn off the phototransistor 38. The MPU 39 only has to on/off control the switching unit upon receipt of external signals indicating a normal operation (continuous operation) and a standby operation (intermittent operation). Accordingly, for example, only an FET may be used in place of the MPU 39.

The diode 44 serving as part of the switching unit is connected between the cathode of the photodiode 42 and the cathode of the photodiode 37. More specifically, the anode of the diode 44 is connected to the cathode of the photodiode 42, and the cathode thereof is connected to the cathode of the photodiode 37. When the MPU 39 acquires or generates an external signal indicating a normal operation, it reduces the voltage of the output terminal C to a low level and thus can pass the required current through the photodiode 42 through the diode 44 to turn on the phototransistor 43. Thus, the FET 18 is turned on, regardless of the level of the voltage detected by the voltage detector 50; the voltage of the STB terminal is reduced to a low level; and the FETs 24 and 25 operate in continuous mode (normal operation). Note that the diode 44 can be replaced by a transistor, an element having an open/close contact, or the like.

The anode of the photodiode 34 is connected to the positive terminal of the output terminals A, and a constant voltage control circuit 36 is connected to the cathode of the photodiode 34. The phototransistor 35 forms a photocoupler with the photodiode 34 and is connected between the current resonant control circuit 17 and the ground level. The constant voltage control circuit 36 controls the output voltage VO so that it becomes a constant voltage during a normal operation. The constant voltage control circuit 36 performs this control by detecting the output voltage VO and reflecting the detection result on the current flowing into the FB terminal of the current resonant control circuit 17 through the photodiode 34 and phototransistor 35.

Figure 2:
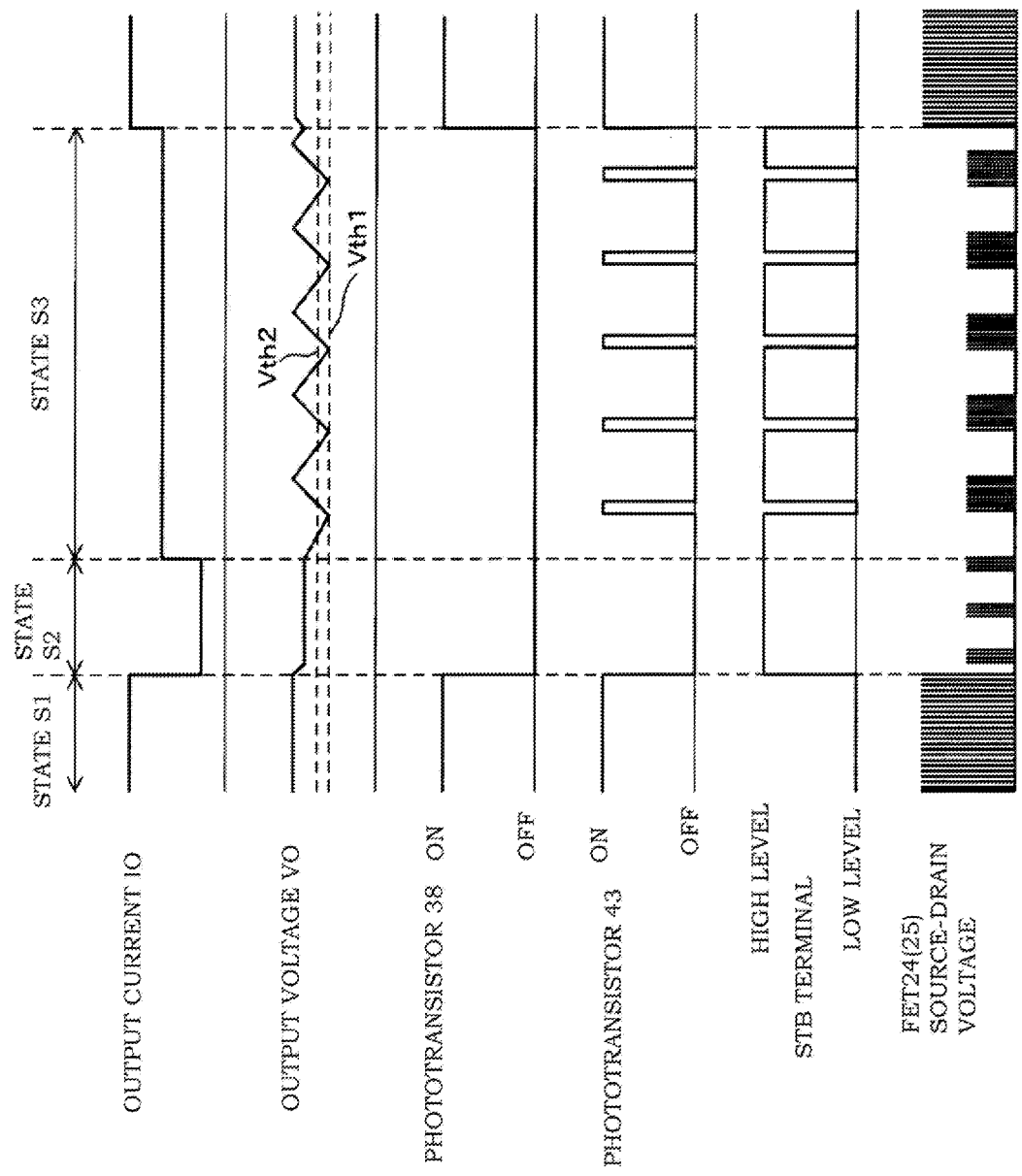
FIG. 2 is a timing chart showing an example of the operation of the power supply device of the first embodiment.
Figure 3:
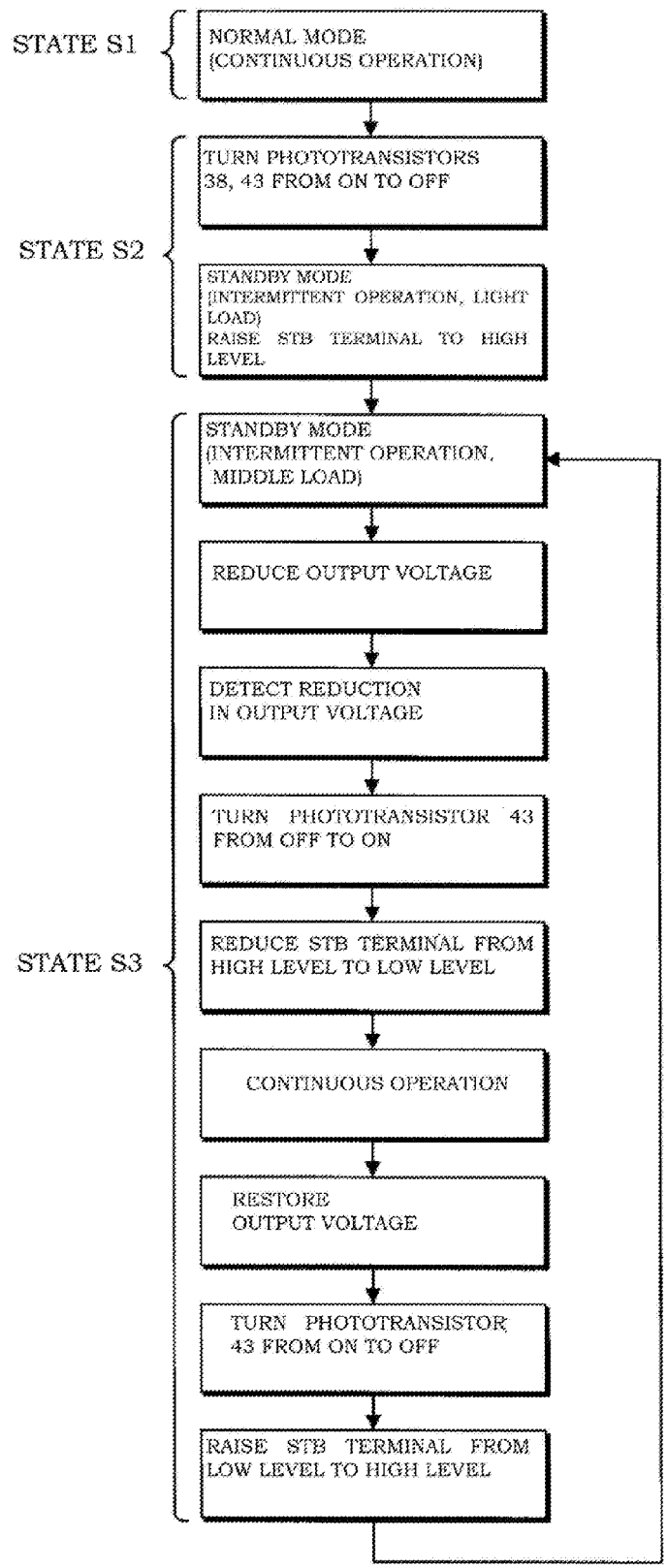
FIG. 3 is a diagram showing an example of the transition of the operation state of the power supply device of the first embodiment.

Next, the operation of the power supply device 100 of the first embodiment will be described. FIG. 2 is a timing chart showing an example of the operation of the power supply device 100 of the first embodiment. FIG. 3 is a diagram showing an example of the transition of the operation state of the power supply device 100 of the first embodiment. Note that voltage and current waveforms in FIG. 2 are schematically shown for simplicity and may differ from actual waveforms. Also, the waveform of an output current IO in state S3 in FIG. 2 is schematically shown for simplicity.

As shown in FIGS. 2 and 3, in state S1, the MPU 39 acquires or generates an external signal indicating a normal operation, and the power supply device 100 operates in normal mode (continuous mode). In this state, the output current is a predetermined current, and the output voltage VO is a predetermined voltage as well. Since the voltage of the output terminal C of the MPU 39 is at a low level, the required current is flowing through the photodiode 37; the phototransistor 38 is on; and the PFC circuit is operating. In normal mode, the output voltage VO is the predetermined voltage and is higher than the first threshold voltage Vth1 and second threshold voltage Vth2; therefore, the voltage of the output terminal OUT of the control IC 53 is at a low level, and the transistor 54 is off. However, the voltage of the output terminal C of the MPU 39 is at a low level and therefore the required current flows through the photodiode 42 through the diode 44. For this reason, the phototransistor 43 is on; the FET 18 is on; the voltage of the STB terminal is at a low level (off); and the FETs 24 and 25 operate continuously.

Then, when the MPU 39 acquires or generates an external signal indicating a standby operation, the power supply device 100 makes a transition from state S1 to state S2. That is, the voltage of the output terminal C of the MPU 39 is raised to a high level. Thus, the current flowing through the photodiode 37 is shut off or reduced; the phototransistor 38 is turned from on to off; and the FET 16 is turned off. As a result, the PFC circuit stops operating. Since the transistor 54 remains off, the current flowing through the photodiode 42 is shut off or reduced; the phototransistor 43 is turned from on to off; the FET 18 is turned off; and the voltage of the STB terminal is raised to a high level. Thus, the FETs 24 and 25 operate intermittently. In this case, the PFC circuit stops operating and thus the voltage inputted to the transformer 20 is not raised. As a result, the voltages between the sources and drains of the FETs 24 and 25 are reduced.

Since the FETs 24 and 25 operate intermittently, the output current IO is reduced in a manner corresponding to a light load in standby mode. For example, if the light load is on the order of several W or less, the FETs 24 and 25 can continue the operation while maintaining the output voltage VO and output current IO.

When, for example, a middle load of more than several W (e.g., several tens of W or so) is connected to the output terminals A in state S2, the power supply device 100 makes a transition from state S2 to state S3. In state S3, required power exceeds the power which can be supplied in standby mode and thus the output voltage VO starts to decrease from the predetermined voltage. When the voltage detector 50 detects that the output voltage VO has fallen below the first threshold voltage Vth1, the transistor 54 is turned on, and the required current flows through the photodiode 42. Thus, the phototransistor 43 is turned from off to on; the FET 18 is turned on; the voltage of the STB terminal is reduced from a high level to a low level; and the FETs 24 and 25 operate continuously in standby mode.

Due to the continuous operation of the FETs 24 and 25 in state S3, the output current IO can supply sufficient power to the middle load. Thus, the output voltage VO starts to increase.

When the voltage detector 50 detects that the output voltage VO has risen above the second threshold voltage Vth2, the transistor 54 is turned off, and the current no longer flows through the photodiode 42. Thus, the phototransistor 43 is turned from on to off; the FET 18 is turned off; the voltage of the STB terminal is raised from a low level to a high level; and the FETs 24 and 25 operate intermittently in standby mode. Thereafter, similar operations are repeated.

Figure 4:
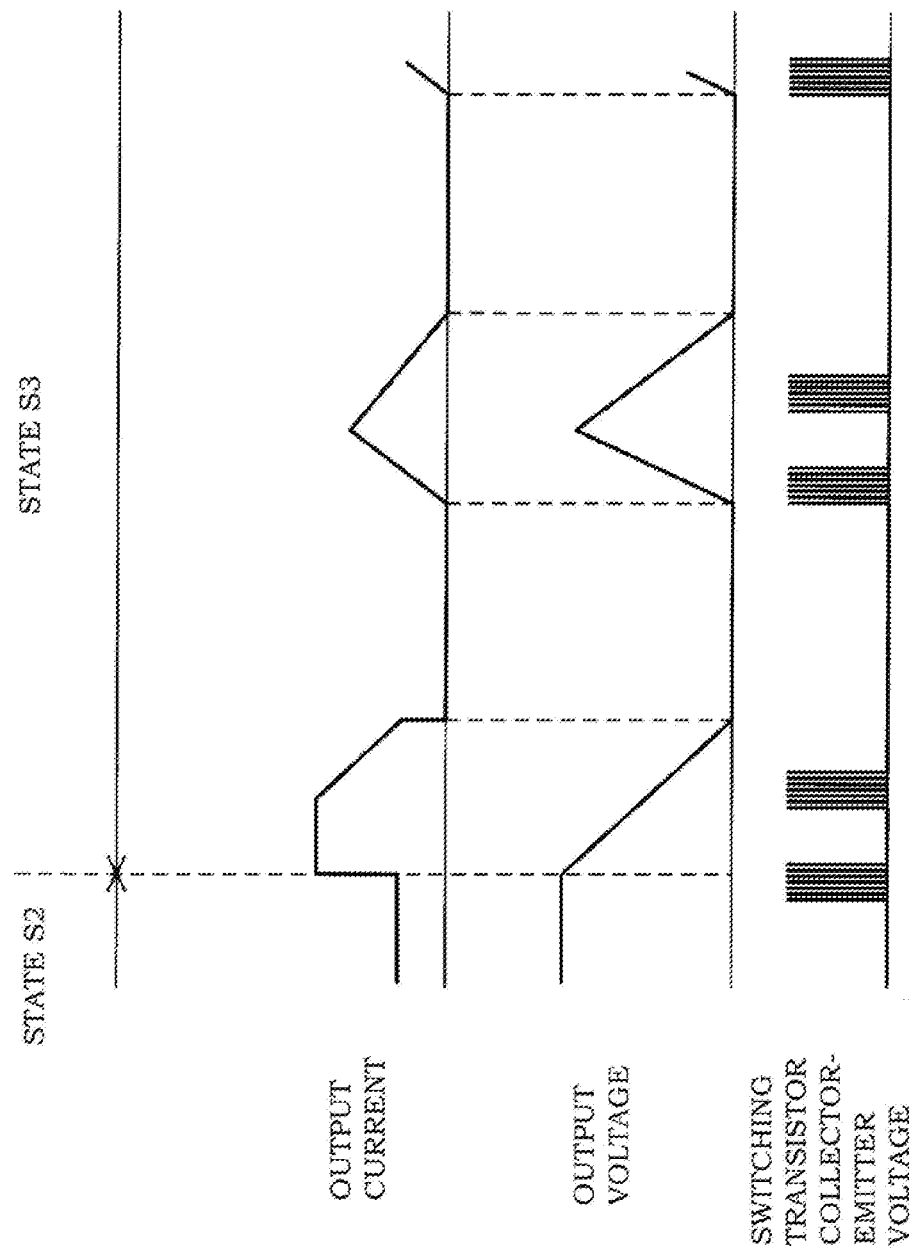
FIG. 4 is a timing chart showing an example of the operation of a conventional power supply device in standby mode.

FIG. 4 is a timing chart showing an example of the operation of a conventional power supply device in standby mode. Note that voltage and current waveforms in FIG. 4 are schematically shown for simplicity and may differ from actual waveforms. In FIG. 4, state S2 indicates a state in which in standby mode a switching transistor operates intermittently and supplies a predetermined small current to a light load, as well as supplies a predetermined output voltage to the light load.

When a middle load is connected to the output terminal of the power supply device in state S2, the power supply device makes a transition to state S3. Thus, the current supplied by the power supply device is reduced, and the output voltage is reduced as well. The reduction in the output voltage results in the shutdown of an electrical apparatus (e.g., a monitor, a display) including the power supply device. Although the power supply device is temporarily shut down, a commercial power supply is connected to the power supply device. Thus, a control circuit in the power supply device starts to operate; the electrical apparatus restarts; and the output voltage and current start to increase. However, the switching transistor operates intermittently. Accordingly, a shortage of power that can be supplied occurs again; the current and output voltage are reduced; and the electrical apparatus is shut down again. Thereafter, similar operations are repeated.

On the other hand, the power supply device 100 of the present embodiment detects the voltage on the secondary side of the transformer 20, that is, the output voltage VO using the voltage detector 50. It is assumed that when the current resonant control circuit 17 is controlling the FETs 24 and 25 so that the FETs operate intermittently, in accordance with an external signal indicating an intermittent operation, that is, when it is supplying power to a less power-consuming load (light load) during standby, the voltage detected by the voltage detector 50 has fallen below the predetermined first threshold voltage Vth1. The reason why the voltage detected by the voltage detector 50 is reduced is that a more power-consuming load (middle load) is connected to the output of the power supply device and thus the load current is increased. In this case, the phototransistor 43 causes the current resonant control circuit 17 to control the FETs 24 and 25 so that the intermittent operation of the FETs 24 and 25 switches to the continuous operation.

As seen above, the intermittent operation of the FETs 24 and 25 temporarily switches to the continuous operation even during standby. Thus, even when a relatively large load (a middle load, for example, several tens of W or so) is connected and thus the load current is increased, the output voltage is prevented from keeping falling below the first threshold voltage Vth1, and the required power can be supplied even during standby.

When the switching unit (phototransistor 43) has caused the FETs 24 and 25 to switch to operate continuously during standby and when the voltage detected by the voltage detector 50 has risen above the second threshold voltage Vth2, which is higher than the first threshold voltage Vth1, the switching unit causes the current resonant control circuit 17 to control the FETs 24 and 25 so that the FETs switches to operate intermittently. When a relatively large load is connected during standby and the operation of the FETs 24 and 25 is switched from the intermittent operation to the continuous operation, a large load current can be supplied. When the sufficient current is supplied to the connected load, the output voltage VO is increased. When the voltage detected by the voltage detector 50 (output voltage VO) has risen above the second threshold voltage Vth2, which is higher than the first threshold voltage Vth1, the operation of the FETs 24 and 25 is returned to the intermittent operation, which is a standby operation, since the sufficient power is being supplied to the load. Further, the first threshold voltage Vth1 and second threshold voltage Vth2 are different voltages and therefore it is possible to prevent the operation from being frequently switched between the intermittent operation and the continuous operation.

Further, when the MPU 39 acquires an external signal indicating a continuous operation and thus the current resonant control circuit 17 controls the FETs 24 and 25 so that the FETs operate continuously, the diode 44 serving as part of the switching unit invalidates the detection of the voltage by the voltage detector 50.

More specifically, by turning on the diode 44 and forcefully turning on the photodiode 42, the phototransistor 43 and FET 18 (the transistor defining a continuous operation or an intermittent operation) are turned on to switch the operation mode to a continuous operation. Thus, when an external signal indicating a continuous operation is acquired, the FETs 24 and 25 can be operated continuously, regardless of the presence of the voltage detector 50. Further, it is possible to reliably prevent the normal operation (continuous operation) of the FETs 24 and 25 from switching to the intermittent operation.

As described above, when the load is light, a predetermined intermittent operation is performed in standby mode and therefore standby power is not increased, that is, standby power is not affected. On the other hand, when a middle load is connected, a continuous operation and an intermittent operation are repeated even in standby mode. Thus, power required by the middle load can be supplied. That is, a medium amount of power or so can be outputted even in standby mode, and there is no need for an auxiliary power supply or the like. Thus, high efficiency, downsizing, cost reduction, the simplification of the circuit, a reduction in substrate area, and the like can be achieved.

Second Embodiment

Figure 5:
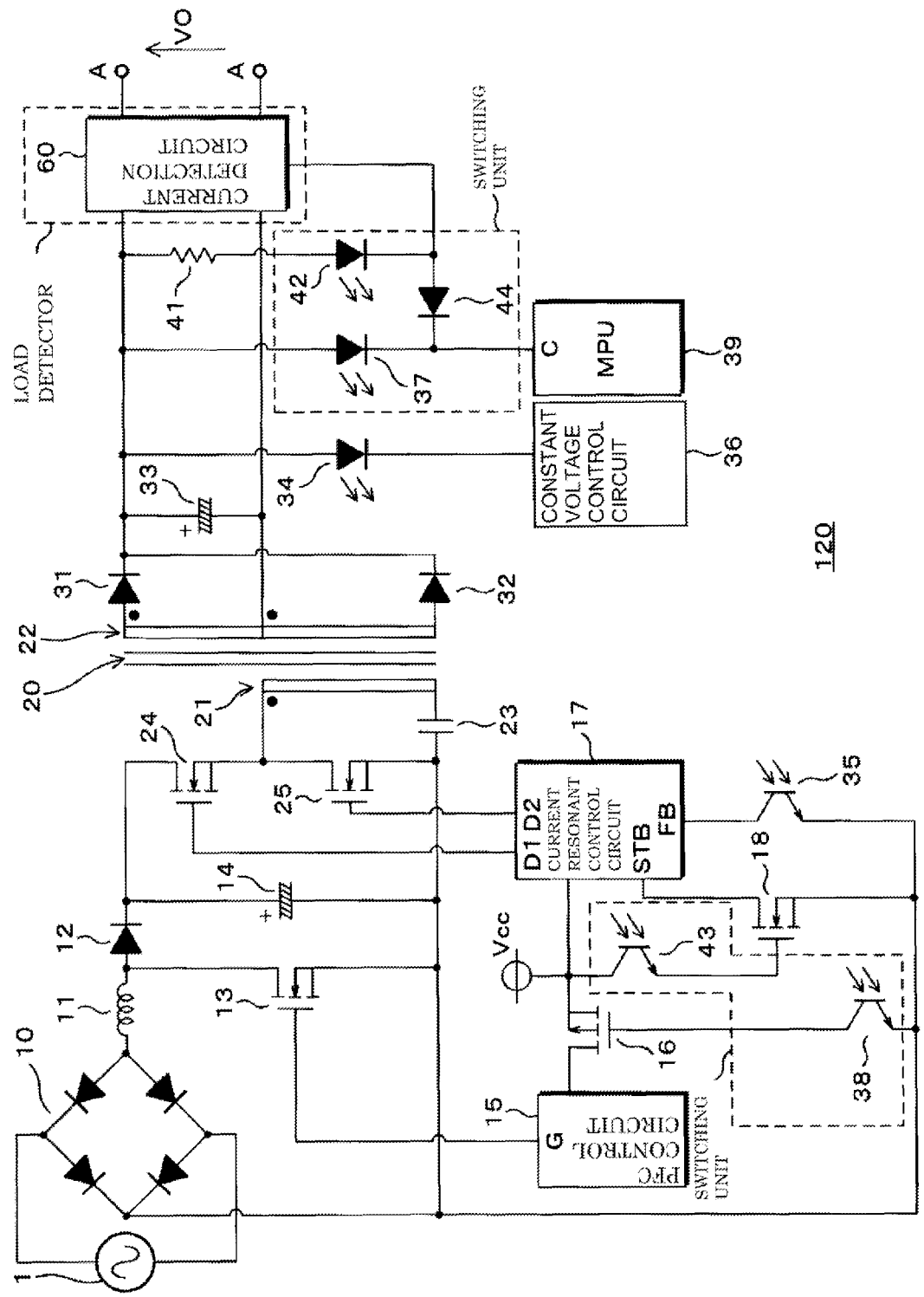
FIG. 5 is a block diagram showing an example of the circuit configuration of a power supply device of a second embodiment.
Figure 6:
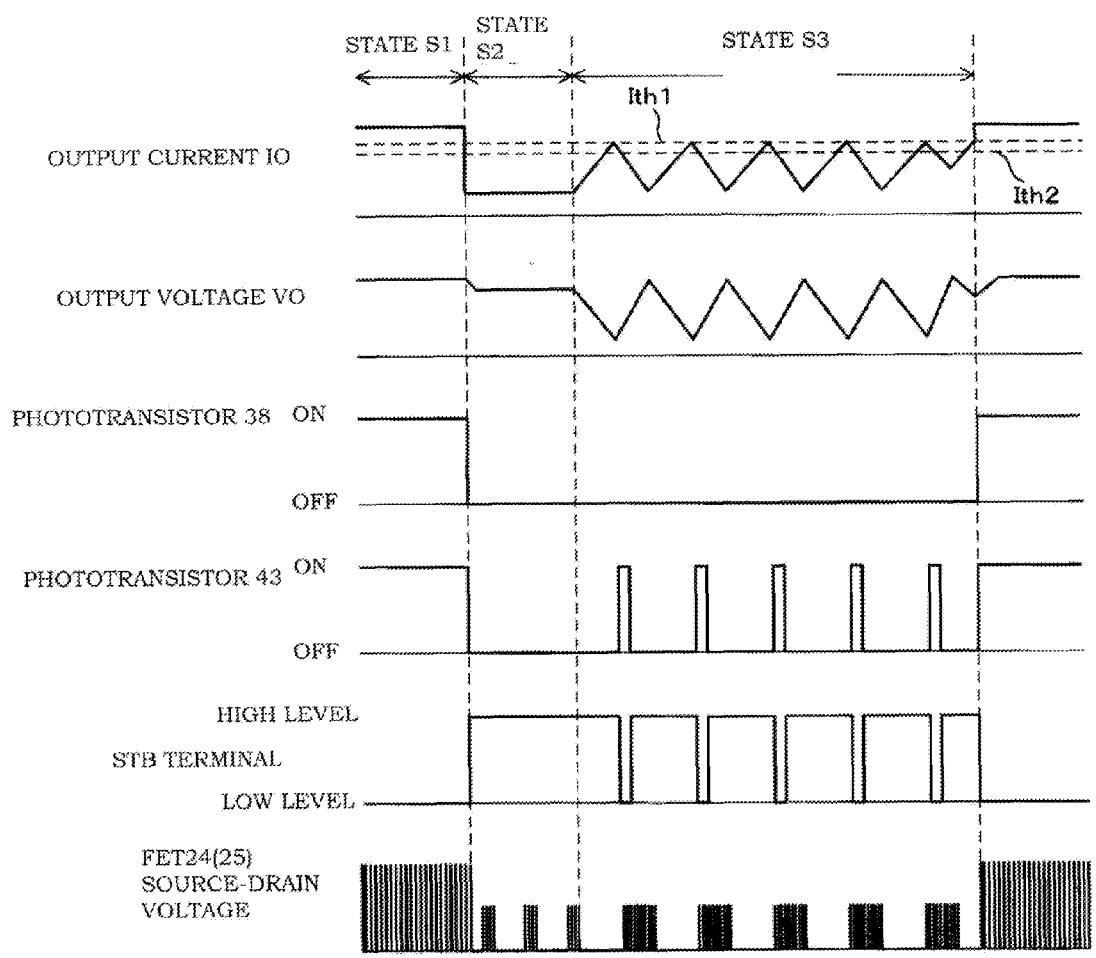
FIG. 6 is a timing chart showing an example of the operation of the power supply device of the second embodiment.

FIG. 5 is a block diagram showing an example of the circuit configuration of a power supply device 120 of a second embodiment. FIG. 6 is a timing chart showing an example of the operation of the power supply device 120 of the second embodiment. The power supply device in FIG. 5 differs from that of the first embodiment in that it includes a current detection circuit 60 as a load detector in place of the voltage detector 50.

As shown in FIG. 6, state S1 and state S2 of the second embodiment are similar to those of the first embodiment.

When, for example, a middle load of more than several W (e.g., several tens of W or so) is connected to output terminals A in state S2, the power supply device 120 makes a transition from state S2 to state S3. In state S3, required power exceed the power which can be supplied in standby mode and thus an output voltage VO is reduced from a predetermined voltage. Also, an output current IO starts to increase so that power is supplied to the load. When the current detection circuit 60 detects that the output current IO has risen above a first threshold current Ith1, it outputs an ON signal for a continuous operation, and the required current flows through a photodiode 42. Thus, a phototransistor 43 is turned from off to on; an FET 18 is turned on; the voltage of the STB terminal is reduced from a high level to a low level; and FETs 24 and 25 operate continuously in standby mode.

Due to the continuous operation of the FETs 24 and 25 in state S3, the output voltage VO is increased, and the output current IO starts to decrease.

When the current detection circuit 60 detects that the output current IO has fallen below a second threshold current Ith2, it outputs OFF, and the current no longer flows through the photodiode 42. Thus, the phototransistor 43 is turned from on to off; the FET 18 is turned off; the voltage of the STB terminal is raised from a low level to a high level; and the FETs 24 and 25 operate intermittently in standby mode. Thereafter, similar operations are repeated.

As with that of the first embodiment, the power supply device of the second embodiment also can supply the required power even during standby.

Third Embodiment

Figure 7:
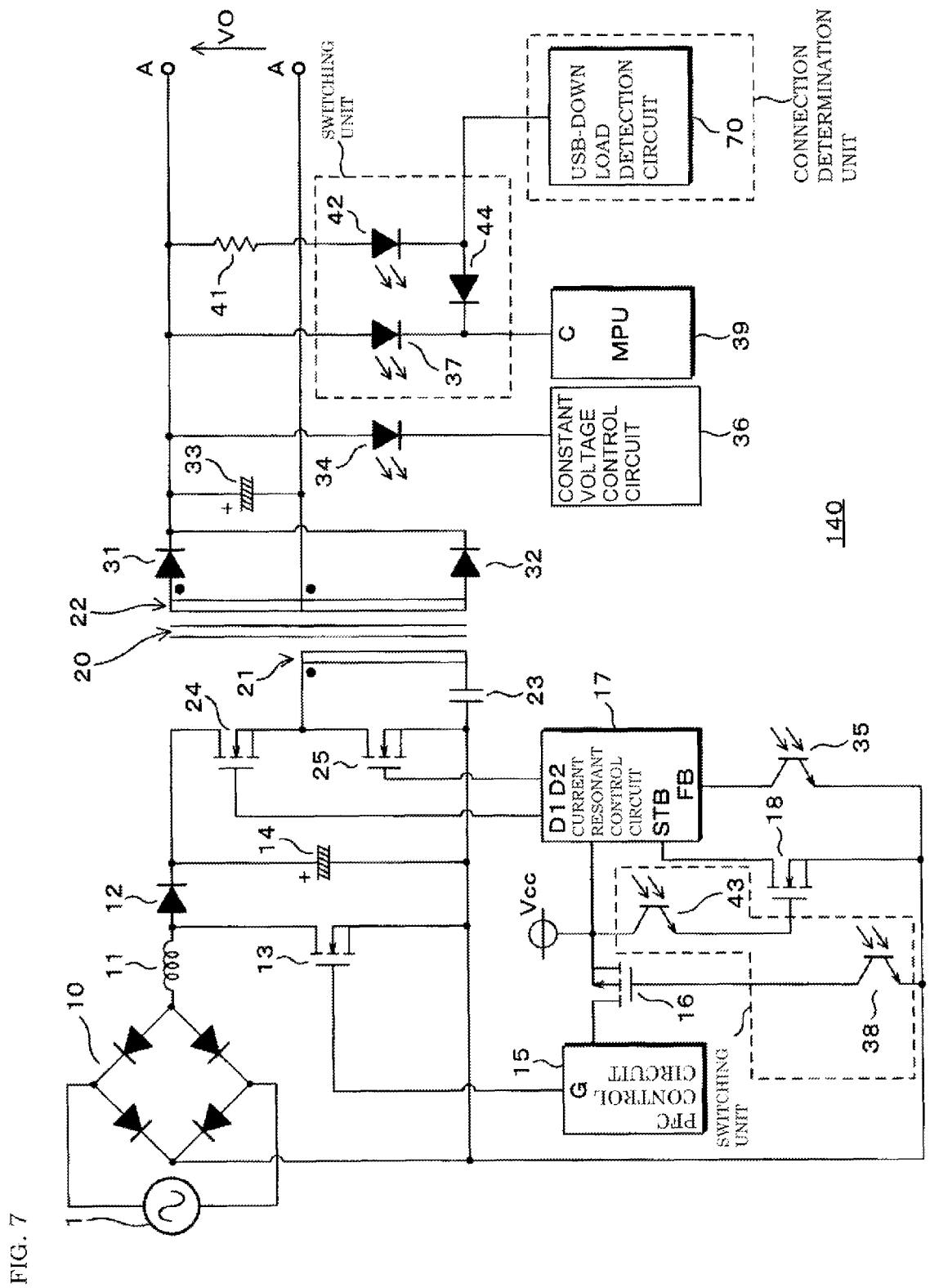
FIG. 7 is a block diagram showing an example of the circuit configuration of a power supply device of a third embodiment.
Figure 8:
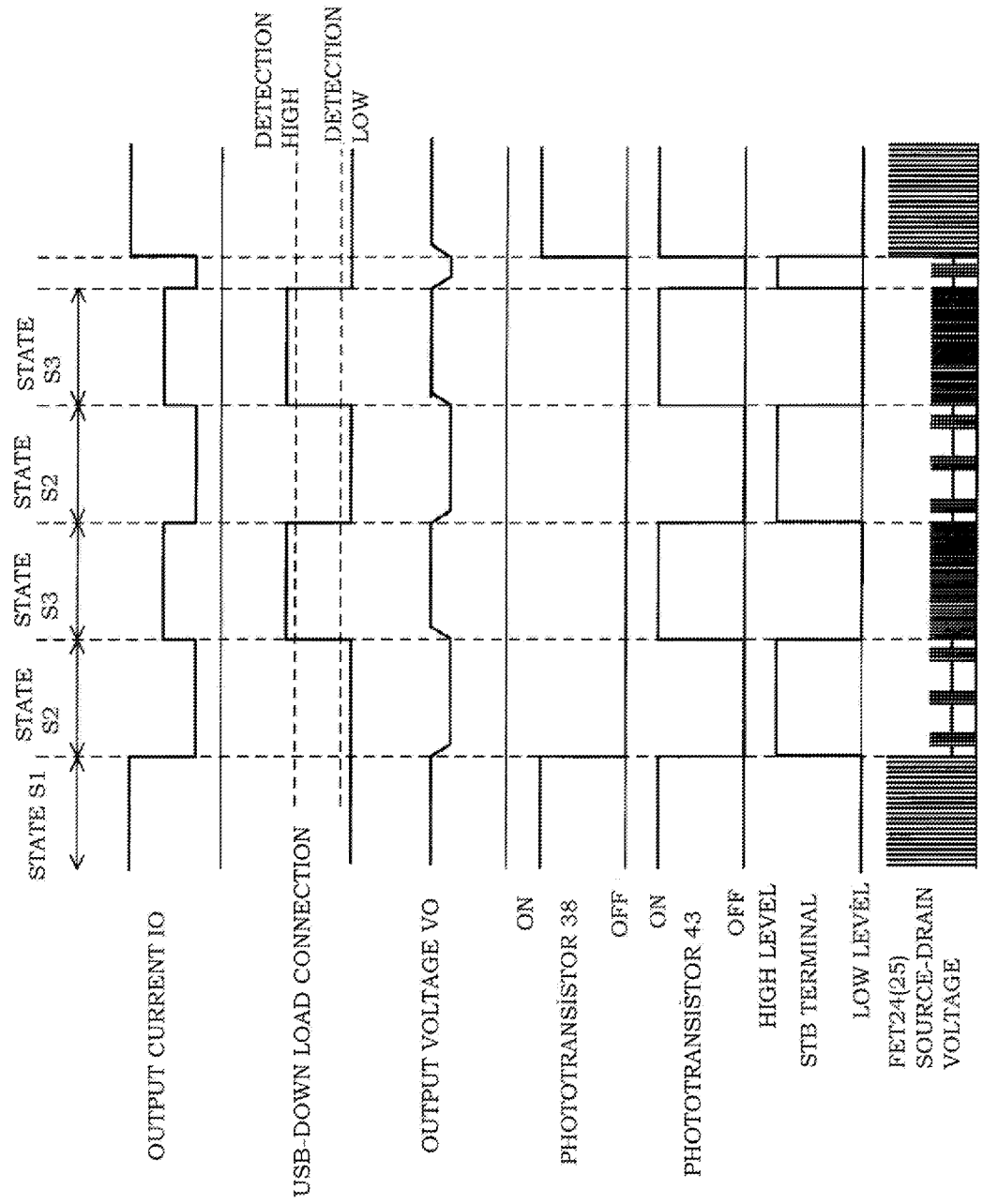
FIG. 8 is a timing chart showing an example of the operation of the power supply device of the third embodiment.

FIG. 7 is a block diagram showing an example of the circuit configuration of a power supply device 140 of a third embodiment. FIG. 8 is a timing chart showing an example of the operation of the power supply device 140 of the third embodiment. The power supply device in FIG. 7 differs from that of the first embodiment in that it includes a USB-DOWN load detection circuit 70 as a connection determination unit in place of the voltage detector 50. As shown in FIG. 7, the connection determination unit includes, for example, the USB-DOWN load detection circuit 70.

The USB-DOWN load detection circuit 70 can be formed by, for example, a switch, such as a mechanical switch or electrical switch, disposed on a connector (not shown) for supplying power from output terminals A of the power source apparatus 140 to an external device (also called, for example, USB-DOWN connector, DOWN connector). The USB-DOWN load detection circuit 70 detects "detection high" and "detection low" as USB-DOWN load connection.

More specifically, when the cable (also referred to as USB-DOWN cable) of an external device is connected to the DOWN connector, the switch is switched (for example, may be turned from OFF to ON or may be turned from ON to OFF), and the USB-DOWN load detection circuit 70 detects "detection high" and thus determines that the external device has been connected (there is connection). On the other hand, when the cable of any external device is not connected to the DOWN connector, the USB-DOWN load detection circuit 70 detects "detection low" and thus determines that any external device has not been connected (there is no connection).

In FIG. 8, state S2 shows a case in which any external device has not been connected.

When an external device is connected in state S2, USB-DOWN load connection becomes "detection high," and the power supply device 140 makes a transition from state S2 to state S3. In state S3, the USB-DOWN load detection circuit 70 passes the required current through a photodiode 42. Thus, a phototransistor 43 is turned from off to on; an FET 18 is turned on; the voltage of the STB terminal is reduced from a high level to a low level; and FETs 24 and 25 operate continuously in standby mode.

Due to the continuous operation of the FETs 24 and 25 in state S3, an output current IO and an output voltage VO are increased and can supply sufficient power to the external device.

When the external device is disconnected from the connector in state S3, USB-DOWN load connection becomes "detection low," and the power supply device 140 makes a transition from state S3 to state S2. In state S2, the USB-DOWN load detection circuit 70 shuts off the current flowing through the photodiode 42. Thus, the phototransistor 43 is turned from on to off; the FET 18 is turned off; the voltage of the STB terminal is raised from a low level to a high level; and the FETs 24 and 25 operate intermittently in standby mode. Thereafter, similar operations are repeated in accordance with whether an external device has been connected.

As with that of the first embodiment, the power source apparatus device of the third embodiment also can supply the required current even during standby.

The power supply devices 100, 120, and 140 can be incorporated into electrical apparatuses, such as a monitor and a display. Thus, it is possible to realize an electrical apparatus in which when the power supply device 100, 120, or 140 is operating intermittently on the basis of an external signal indicating an intermittent operation acquired from the outside or inside of the electrical apparatus and when a more power-consuming external load (middle load) is connected to a connector (e.g., a USB connector) connected to the output terminals A of the power supply device, the power supply device can temporarily switch the operation mode from an intermittent operation to an continuous operation and supply the required power to the external load.

REFERENCE SIGNS LIST

17 current resonant control circuit (controller)
18 FET (controller, transistor)
20 transformer (current resonant circuit)
21 primary winding
22 secondary winding
23 capacitor (current resonant circuit)
24, 25 FET (switching element)
39 MPU
42 photodiode (switching unit)
43 phototransistor (switching unit)
44 diode (switching unit)
50 voltage detector (load detector)
60 current detection circuit (load detector)
70 USB-DOWN load detection circuit (connection determination unit)

The invention claimed is:

1. A power supply device comprising:
a current resonant circuit configured to drive a transformer and a resonant circuit using a switching element, the resonant circuit being connected to a primary side of the transformer, the switching element being periodically repeatedly turned on and off, and a controller configured to control the switching element so that the switching element performs a continuous operation in which the switching element is turned on and off continuously repeatedly or an intermittent operation in which the switching element is turned on and off intermittently repeatedly, in accordance with an external signal from MPU, indicating the continuous operation or the intermittent operation, the power supply device further comprising a voltage detector configured to detect a voltage on a secondary side of the transformer; and
a switching unit configured to, when the controller is controlling the switching element so that it performs the intermittent operation, in accordance with an external signal indicating the intermittent operation and when a voltage detected by the voltage detector has fallen below a predetermined first threshold voltage, cause the controller to control the switching element so that it forcibly switches to perform the continuous operation.

2. The power supply device of claim 1, wherein when the switching unit has caused the controller to control the switching element so that it forcibly switches to perform the continuous operation and when the voltage detected by the voltage detector has risen above a second threshold voltage which is higher than the first threshold voltage, the switching unit causes the controller to control the switching element so that it switches to perform the intermittent operation.

3. The power supply device of claim 1, wherein when the controller is being given an external signal indicating the continuous operation, the switching unit invalidates detection of the voltage by the voltage detector.

4. The power supply device of claim 3, wherein the voltage detector comprises a plurality of resistors connected to the secondary side of the transformer in series,
the switching unit comprises a photodiode configured to be turned on or off in accordance with a voltage divided by the resistors and a phototransistor disposed on a primary side of the transformer and configured to be turned on or off in response to the photodiode being turned on or off, and
the controller comprises a transistor configured to determine the continuous operation or the intermittent operation in accordance with an on state or an off state of itself and is configured to turn on or off the transistor in response to the phototransistor being turned on or off.

5. The power supply device of claim 4, wherein the switching unit further comprises a diode connected to a cathode of the photodiode and is configured to, when the switching unit is being given an external signal indicating the continuous operation, turn on the diode.

6. An electrical apparatus comprising:
the power supply device of claim 1; and
a connector disposed on a secondary side of the transformer, wherein when the power supply device is given an external signal indicating the intermittent operation, the power supply device can supply power to an external device connected to the connector.

7. A power supply device that comprising:
a current resonant circuit configured to drive a transformer and a resonant circuit using a switching element, the resonant circuit being connected to a primary side of the transformer, the switching element being periodically repeatedly turned on and off, and a controller configured to control the switching element so that the switching element performs a continuous operation in which the switching element is turned on and off continuously repeatedly or an intermittent operation in which the switching element is turned on and off intermittently repeatedly, in accordance with an external signal from MPU, indicating the continuous operation or the intermittent operation, the power supply device further comprising a load detector configured to detect magnitude of a load on a secondary side of the transformer; and
a switching unit configured to, when the controller is controlling the switching element so that it performs the intermittent operation, in accordance with an external signal indicating the intermittent operation and when a load detected by the load detector has become larger than a predetermined first threshold, cause the controller to control the switching element so that it forcibly switches to perform the continuous operation.

8. A power supply device comprising:
a current resonant circuit configured to drive a transformer and a resonant circuit using a switching element, the resonant circuit being connected to a primary side of the transformer, the switching element being periodically repeatedly turned on and off, and a controller configured to control the switching element so that the switching element performs a continuous operation in which the switching element is turned on and off continuously repeatedly or an intermittent operation in which the switching element is turned on and off intermittently repeatedly, in accordance with an external signal from MPU, indicating the continuous operation or the intermittent operation, the power supply device further comprising a connection determination unit configured to determine whether an external device has been connected to a secondary side of the transformer; and
a switching unit configured to, when the controller is controlling the switching element so that it performs the intermittent operation, in accordance with an external signal indicating the intermittent operation and when the connection determination unit determines that an external device has been connected, cause the controller to control the switching element so that it forcibly switches to perform the continuous operation.

* * * * *